US006290880B1

(12) United States Patent

Ryan et al.

(10) Patent No.: US 6,290,880 B1

(45) Date of Patent: Sep. 18, 2001

(54) ELECTRICALLY CONDUCTING RUTHENIUM DIOXIDE-AEROGEL COMPOSITE

(75) Inventors: Joseph V. Ryan, Aurora, OH (US); Celia I. Merzbacher, Alexandria, VA (US); Alan D. Berry, Springfield, VA (US); Debra R. Rolison, Arlington, VA (US); Jeffery W. Long, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/452,378

(22) Filed: Dec. 1, 1999

(51) Int. Cl.[7] .............................. H01B 1/14; C01B 55/00

(52) U.S. Cl. .................................... 252/518.1; 252/521.3; 423/22

(58) Field of Search .............................. 252/518.1, 521.3; 423/592, 22

(56) References Cited

U.S. PATENT DOCUMENTS

| | | | |
|---|---|---|---|
| 4,298,439 | 11/1981 | Gafney | 204/157.1 W |
| 5,855,953 | 1/1999 | Cao et al. | 427/226 |
| 5,879,744 | 3/1999 | Cao et al. | 427/248.1 |

OTHER PUBLICATIONS

Yuan et al, "Low Temperature Chemical Vapor Deposition of Ruthenium Dioxide from Ruthenium Tetroxide: a Simple Approach to High–Purity $RuO_2$ Films", Chem. Mater. 1993, 5, pp 908–910.

Sankar et al, "Low Temperature Chemical Vapour Deposition of Ruthenium and Ruthenium Dioxide on Polymer Surfaces", J. Mater. Chem., 1999, 9, pp 2439–2444.

Rolison et al, "Aerogels: A Nanoscale Platform to Integrate Materials for Electrocatalysis" abstract, Fall Meeting of the Materials Research Socied, Nov. 30–Dec. 4, 1998, Boston, MA, (released in summer or fall of 1998).

Rolison et al. "The Physical and Chemical Properties . . . ", Book of Abstracts, 217th ACS National Meeting, Anaheim Calif., Mar. 21–25, 1999. Abstract Only.*

Long et al "Voltammetric Characterization of Ruthenium Oxide–Based Aerogels . . . ", Langmuir, 1999, 15, 780785.*

Merzbacher et al. "Characterization of Multi–phase aerogels . . . ", Journal of Non–crystalline Solids 255 (1999) 234–238, Apr. 1998.*

Swider et al. "Synthesis of Ruthenium Dioxide–Titanium Dioxide Aerogles . . . ", Chem. Mater. 1997, 9, 1248–1255.*

Merzbacher et al. "Structure of Ru–Ti Oxide aerogels: a SANS study", Advances in Colloid and Interface Science, 76–77 (1998) 57–69, Jul. 1998.*

Swider et al. "Aerogels as a tool to study the electrical properties of ruthenium dioxide", Journal of Non–Crystalline Solids, 225 (1998) 348–352, Mar. 1999.*

* cited by examiner

*Primary Examiner*—Mark Kopec

(74) *Attorney, Agent, or Firm*—John J. Karasek; Philip E. Ketner

(57) ABSTRACT

An electrically conducting composite is made by providing an aerogel structure of nonconducting material, exposing the aerogel structure to a mixture of $RuO_4$ and a nonpolar solvent in an inert atmosphere, wherein the mixture is held initially at a first temperature that is below the temperature at which $RuO_4$ decomposes into $RuO_2$ in the nonpolar solvent and in the presence of the aerogel, and allowing the mixture to warm to a second temperature that is above the temperature at which $RuO_4$ decomposes to $RuO_2$ in the nonpolar solvent and in the presence of the aerogel, wherein the rate of warming is controlled so that as the mixture warms and the $RuO_4$ begins to decompose into $RuO_2$, the newly formed $RuO_2$ is deposited throughout the aerogel structure as a three-dimensionally networked conductive deposit.

5 Claims, No Drawings

ELECTRICALLY CONDUCTING RUTHENIUM DIOXIDE-AEROGEL COMPOSITE

BACKGROUND OF THE INVENTION

1. Field of the Invention

The invention relates generally to aerogel composite materials and methods of making them. In particular, the invention relates to an aerogel structure having an electrically connected network of ruthenium dioxide deposited throughout the structure and to methods of making the composite.

2. Background of the Related Art

Ruthenium dioxide ($RuO_2$), one of the platinum group metal oxides, is an important industrial material due to its metallic electrical conductivity ($RuO_2$ single crystal conductivity approaches $10^5$ S/cm at 25° C.) along with its excellent chemical and thermal stability and diffusion barrier properties. These characteristics have led to the use of ruthenium dioxide in electrodes for catalysis, electrolysis, photovoltaic devices, capacitors, thick and thin film resistors, etc.

Many techniques based on chemical vapor deposition (CVD) have been developed for depositing dense $RuO_2$ films on flat substrates, including: sputtering or evaporating ruthenium metal in the presence of oxygen; plasma decomposition of Ru-bearing gases by glow discharge; thermal or photolytic decomposition of one of several organometallic precursors. Deposition by reacting oxygen with evaporated metal vapor can be activated by applying a dc current or r.f. radiation, as described in U.S. Pat. No. 5,055,319 to Bunshah et al. In Yuan et al. "Low-Temperature Chemical Vapor Deposition of Ruthenium Dioxide from Ruthenium Tetroxide: A Simple Approach to High-Purity RuO2 Films" Chem. Mater. 5 (1993) pp 908–910, incorporated herein by reference, the deposition of $RuO_4$, which spontaneously reduces to $RuO_2$, by CVD is described. The precursor was either $RuO_4$ in a solution of water, pentane or carbon tetrachloride or pure $RuO_4$ solid. Using this approach, $RuO_2$ films 1-micron thick with resistivities of about $10^{-2}$ ohm-cm were prepared.

For many $RuO_2$ applications such as catalytic and sensing applications, it is desirable that the $RuO_2$ material have the highest possible surface area in order to maximize the number of reaction sites. Conventionally, porous $RuO_2$ electrodes are prepared by dip-coating a substrate in $RuCl_3$ solution and heating in air to decompose the salt to $RuO_2$. A technique for increasing the porosity of $RuO_2$ by doping the ruthenium chloride solution with lanthanum chloride and, after firing, removing the lanthanum oxide by dissolving in sulfuric acid is described in Takasu et al., J. Alloys Comp. 261 (1997) p. 172, incorporated herein by reference. The $RuO_2$ is stable and is five times "rougher" than the sample prepared without La doping. These materials have good electrical conductivity, but the surface area is still fairly low.

Aerogels are a class of materials typified by extremely high surface area (up to 1000 $m^2/g$) and porosity (up to greater than 99%). These properties are generally achieved by extracting the solvent from the pores of a wet porous gel under supercritical conditions, thereby avoiding shrinkage caused by capillary forces that develop during ambient drying. Although a wide range of aerogel compositions are possible, silica is the most widely studied. When formed by catalyzed hydration and polycondensation of a metal alkoxide solution, followed by exchange of pore-filling solvent with, and then removal of, supercritical carbon dioxide, silica forms a relatively robust monolith with extremely low electrical and thermal conductivity.

Efforts have been made previously to develop techniques to deposit Ru oxide on porous substrates. U.S. Pat.No. 4,298,439 to Gafney, incorporated herein by reference, claims a process for adsorbing $RuCl_3$ in aqueous solution in/on a porous glass and then oxidizing in air at 120° C. for one week to obtain the oxide. There is no indication whether this process resulted in a conductive film. Miller et al, J. Electrochem Soc. 144 (1997) L309, incorporated herein by reference, discloses a method of depositing Ru oxide by heating a volatile organometallic Ru compound in the presence of carbon aerogel in a sealed reactor. Decomposing the deposited organometallic by heating in flowing argon resulted in 2-nm Ru particles dispersed throughout the aerogel pores. The Ru/carbon aerogel composite had significantly higher specific capacitance than the untreated aerogel, but the Ru phase did not form its own electrically conductive network.

SUMMARY OF THE INVENTION

It is an object of the present invention to provide an electrically conducting structure having a high surface area.

It is a further object of the present invention to provide a method of forming an electrically connected deposit of $RuO_2$ throughout an aerogel.

It is a fierier object of the present invention to provide a method of forming an electrically connected deposit of $RuO_2$, wherein the method does not require high temperatures.

These and other objects are achieved by an electrically conducting composite made by a method comprising the steps of providing an aerogel structure, exposing the aerogel structure to a mixture of $RuO_4$ and a nonpolar solvent in an inert atmosphere, wherein the mixture is held initially at a first temperature that is below the ambient temperature and below the temperature at which $RuO_4$ decomposes into $RuO_2$ in the nonpolar solvent and in the presence of the aerogel, and allowing the mixture to warm to a second temperature that is above the temperature at which $RuO_4$ decomposes to $RuO_2$ in the nonpolar solvent and in the presence of the aerogel, wherein the rate of warming is controlled so that as the mixture warms and the $RuO_4$ begins to decompose into $RuO_2$, the newly formed $RuO_2$ is deposited throughout the aerogel structure as an electrically connected conductive deposit.

DETAILED DESCRIPTION OF THE PREFERRED EMBODIMENTS

The aerogel structure of the present invention can be any conventionally known aerogel material. Preferably, the aerogel structure is made of a nonconducting material, such as silica. Typically, the aerogel structure is a silica aerogel prepared by acid- or base-catalyzed hydration and condensation of a metal alkoxide, tetramethoxysilane (TMOS), followed by washing to replace the pore liquid with acetone and then drying under supercritical $CO_2$. The resulting monolithic aerogel consists of microporous (less than 2 nm pores) clusters that are about 10 nm in diameter, connected in a three-dimensional mesoporous (2–50 mn pores) network. The as-dried material has a surface area of about 800 $m^2/g$. In order to strengthen the aerogel to allow refilling of the pores by a pentane solution, the aerogel is partially densified by sintering, typically at 900° C. After sintering, the mocropores are gone, and the partially densified aerogel is about 80% porous with a surface area of about 400–500

$m^2/g$. Collapsing the micropores within the silica domains provides a material that still has an ultra-high surface area, but does not have an extensive microporous area that would trap and isolate a deposited material.

To create an electrically connected deposit of $RuO_2$ throughout the aerogel, the aerogel is exposed to a mixture of $RuO_4$ and a nonpolar solvent. A nonpolar solvent such as pentane is preferred over an aqueous or nonpolar solvent because it has a lower surface tension, which minimizes capillary forces during re-wetting and re-drying of the aerogel at subcritical conditions. The mixture is initially kept at a temperature below the ambient temperature and below the temperature at which $RuO_4$ decomposes into $RuO_2$ (the temperature varies according to the solvent). Then the mixture is allowed to warm above the temperature at which $RuO_4$ decomposes into $RuO_2$ in the particular solvent and in the presence of the aerogel structure (In the presence of a substrate such as an aerogel, $RuO_4$ decomposes at a lower temperature than it does in the absence of the substrate.). The rate of warming of the mixture is controlled so that the mixture has time to completely infiltrate the aerogel before the $RuO_4$ decomposes. In this way, when the $RuO_4$ decomposes, it forms a deposit on the inner and outer surfaces of the aerogel. (If the warming proceeds too quickly, newly formed $RuO_2$ simply precipitates directly out of solution onto the bottom of the reaction vessel.) An electrically connected deposit is achieved by selecting a concentration of the $RuO_4$ in the nonpolar solvent and a volume of the solution that is high enough so that when $RuO_2$ becomes deposited onto the surfaces of the aerogel, a sufficient amount of $RuO_2$ is present so that individual deposits are in electrical contact with each other. As used herein, the term "electrically connected" means that for the most part, individual deposits throughout the entire aerogel structure are in electrical contact with each other, notwithstanding that there may inevitably be a few scattered or isolated deposits of $RuO_2$ within the aerogel that are isolated or out of contact.

In the processes described herein, pentane is the preferred nonpolar solvent. Pentane has a lower freezing temperature (−129.7° C.) than water and $RuO_4$ is quite soluble in pentane. There is a dramatic decrease in $RuO_4$ solubility with increasing temperature between −78° C. and room temperature that leads to efficient deposition of Ru oxide from a pentane solution. When the temperature is raised slowly, $RuO_2$ preferentially forms on the aerogel surfaces. Optimally, the ratio of the amount of substrate to $RuO_2$ is high enough that all of the $RuO_2$ is deposited within the sample and none is wasted by precipitating outside the substrate as $RuO_2$ powder, yet low enough that there is sufficient $RuO_2$ to form a fully connected network throughout the aerogel.

A typical process of making an electrically conductive composite may be described as follows: Briefly, a piece of silica aerogel (about 0.25 $cm^3$) is placed in a vacuum-tight flask, evacuated to $5\times10^{-6}$ Torr, saturated with pentane vapors at ambient temperature, and cooled to −78° C. (Solution extraction is used to exchange $RuO_4$ in aqueous solution (10 mL of 0.5 wt % $RuO_4$) into about 10 mL of pentane solution.) The $RuO_4$ pentane solution is added to the flask and all but about 3 mL of the pentane is removed by distillation. The flask is allowed to wann gradually to room temperature over a period of about two days. Based on intermittent observations, the aerogel changes from transparent to black at about −35° C., corresponding to the conversion of $RuO_4$ to $RuO_2$. The flask is held at room temperature for more than 12 hours, then cooled again to −78° C. and the remaining pentane is distilled off. Approximately 90 to 100 wt % of the Ru in solution is deposited on the aerogel surfaces as $RuO_2$, and about 10 to 0 wt % of the Ru in solution precipitates directly from solution as ruthenium dioxide powder. The identity of the deposit as $RuO_2$ can be confirmed by microprobe Raman spectroscopy. Electrical conductivity of the deposit through the interior of the aerogel, and not just along the external edges of the aerogel structure can be confirmed by 2-point probe measurements across the face of a bisected cylindrical monolith of the aerogel. Typical composites have been shown to have resistivities of about 1–10 Mohms for a 0.3 cm thick sample. The resistance is decreased by two to three orders of magnitude by heating the composite in flowing oxygen or air to about 140–150° C. This mild heat treatment increases the area of contact between deposited particles and, as confirmed by transmission electron microscopy, converts the deposited ruthenium oxide from amorphous to crystalline. (Increasing the annealing temperature to above about 200–250° C. leads to a decrease in electrical conductivity, presumably due to grain-size coarsening. The exact temperature at which this decrease in electrical conductivity begins to occur varies with the rate of heating.) Small angle neutron scattering confirms observations made by transmission electron microscopy that the deposits of $RuO_2$ conform to the morphology ofthe silica surface and do not form particles that fill the mesoporous volume of the aerogel.

Having described the invention, the following examples are given to illustrate specific applications of the invention, including the best mode now known to perform the invention. These specific examples are not intended to limit the scope of the invention described in this application.

EXAMPLE

Silica Aerogel Synthesis.

Silica aerogels were prepared by base-catalyzed hydration and condensation of a metal alkoxide, tetramethoxysilane (TMOS), followed by washing to replace the pore liquid with acetone and then drying under supercritical $CO_2$. Dried aerogels were heated to 900° C. at 2 ° C. /min. Tablets 2–3 mm thick were shaped by grinding with dry 600-grit carbide paper.

$RuO_2$ Deposition.

Up to four pieces weighing a total of about 100 mg were placed in a round-bottom flask with a sidearm and evacuated to $5\times10^{-6}$ Torr. Approximately 2–3 ml of purified pentane was condensed in the sidearm, then warmed to room temperature and allowed to equilibrate with the aerogel. Cooling the flask to −78° C. caused the pentane to condense in the flask and surround and penetrate the aerogel pieces. $RuO_4$ was transferred from 10 ml of a 0.5-wt % $RuO_4$ aqueous solution to about 8 ml of pentane by room temperature solvent extraction, added to the flask and held in a dry ice and acetone slurry (−78° C.). All but 2–3 ml of pentane was removed by vacuum distillation. The bath and sample was allowed to warm gradually over a period of 2–3 days. Based on periodic visual inspection, the sample changed from transparent to black at about −35° C., corresponding to the initial conversion of $RuO_4$ to $RuO_2$. After the sample reached room temperature, the flask was cooled to −78° C. and the remaining pentane was removed by vacuum distillation. Thereafter, the composite was heated at 2° C./min to about 140–150° C. under flowing $O_2$.

Obviously, many modifications and variations of the present invention are possible in light of the above teachings. It is therefore to be understood that, within the scope ofthe appended claims, the invention may be practiced otherwise than as specifically described.

What is claimed is:

1. A method of creating an electrically conductive composite comprising an aerogel structure and an electrically connected conductive deposit of $RuO_2$ throughout the structure, the method comprising the steps of:

providing an aerogel structure, exposing the aerogel structure to a mixture of $RuO_4$ and a nonpolar solvent in an inert atmosphere, wherein the mixture is held initially at a first temperature that is below the ambient temperature and below the temperature at which $RuO_4$ decomposes into $RuO_2$ in the nonpolar solvent and in the presence of the aerogel, and allowing the mixture to warm to a second temperature that is above the temperature at which $RuO_4$ decomposes to $RuO_2$ in the nonpolar solvent and in the presence of the aerogel, wherein the rate of warming is controlled so that as the mixture warms and the $RuO_4$ begins to decompose into $RuO_2$, the newly formed $RuO_2$ is deposited throughout the aerogel structure as an electrically connected conductive deposit.

2. The method of claim 1 including the subsequent steps of:

removing the solvent from the electrically conductive composite formed therein and heating the electrically conductive composite at a temperature sufficient to convert the deposited $RuO_2$ from an amorphous state to a crystalline state.

3. The method of claim 1 wherein the aerogel structure is a partially densified silica aerogel.

4. The method of claim 1 wherein the nonpolar solvent is pentane.

5. A method of creating an electrically conductive composite comprising an aerogel structure of nonconducting material and an electrically connected conductive deposit of $RuO_2$ throughout the structure, the method comprising the steps of:

providing a silica aerogel structure, sintering the silica aerogel structure to create a partially densified silica aerogel structure, exposing the partially densified silica aerogel structure to a mixture of $RuO_4$ and pentane in an inert atmosphere, wherein the mixture is held initially at a temperature of about −78° C., allowing the mixture to warm to about room temperature, wherein the rate of warming is controlled so that as the mixture warms, $RuO_4$ begins to decompose into $RuO_2$ and the newly formed $RuO_2$ is deposited throughout the aerogel structure to form an electrically connected conductive deposit, removing the solvent from the electrically conductive composite formed thereby, and heating the electrically conductive composite at a temperature sufficient to convert the deposited $RuO_2$ from an amorphous state to a crystalline state.

* * * * *